US011637303B2

(12) United States Patent
Yamano et al.

(10) Patent No.: US 11,637,303 B2
(45) Date of Patent: Apr. 25, 2023

(54) FUEL CELL SYSTEM

(71) Applicant: HONDA MOTOR CO., LTD., Tokyo (JP)

(72) Inventors: Naoki Yamano, Wako (JP); Takuya Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,209

(22) Filed: Feb. 23, 2022

(65) Prior Publication Data
US 2022/0320547 A1 Oct. 6, 2022

(30) Foreign Application Priority Data

Mar. 31, 2021 (JP) .............................. JP2021-060478

(51) Int. Cl.
*H01M 8/04746* (2016.01)
*H01M 8/04029* (2016.01)
*H01M 8/04007* (2016.01)
*H01M 8/04537* (2016.01)
(Continued)

(52) U.S. Cl.
CPC ... *H01M 8/04768* (2013.01); *H01M 8/04029* (2013.01); *H01M 8/04044* (2013.01);
(Continued)

(58) Field of Classification Search
CPC ......... H01M 8/04768; H01M 8/04029; H01M 8/04067; H01M 8/04358; H01M 8/04619;
(Continued)

(56) References Cited

U.S. PATENT DOCUMENTS

2002/0164511 A1* 11/2002 Uozumi ............ H01M 8/04029
429/429
2006/0269807 A1* 11/2006 Fujita ................ H01M 8/04029
429/442
(Continued)

FOREIGN PATENT DOCUMENTS

JP  05-315002    11/1993
JP  2005-085482   3/2005
(Continued)

OTHER PUBLICATIONS

Japanese Office Action for Japanese Patent Application No. 2021-060478 dated Jan. 31, 2023.

*Primary Examiner* — Stewart A Fraser
(74) *Attorney, Agent, or Firm* — Amin, Turocy & Watson, LLP

(57) ABSTRACT

A fuel cell system includes a first ion exchanger, a first fuel cell stack and a second fuel cell stack, a first temperature acquisition part and a second temperature acquisition part, a first power generation time acquisition part and a second power generation time acquisition part, a supply path, an ion concentration estimation part that estimates ion concentration of a refrigerant on the basis of the ion concentration estimated by the ion concentration estimation part, a determination part that determines an exchange timing of the first ion exchanger on the basis of the ion concentration estimated by the ion concentration estimation part, and a control part, and a first refrigerant flow path and a second refrigerant flow path are provided in series or in parallel.

7 Claims, 5 Drawing Sheets

(51) Int. Cl.
*H01M 8/0432* (2016.01)
*H01M 8/04044* (2016.01)
*H01M 8/0444* (2016.01)
*H01M 8/04664* (2016.01)
*B60L 50/72* (2019.01)

(52) U.S. Cl.
CPC ... *H01M 8/04067* (2013.01); *H01M 8/04358* (2013.01); *H01M 8/04485* (2013.01); *H01M 8/04619* (2013.01); *H01M 8/04679* (2013.01); *B60L 50/72* (2019.02); *H01M 2250/20* (2013.01)

(58) Field of Classification Search
CPC ......... H01M 2250/20; H01M 8/04044; H01M 8/04485; H01M 8/04679; H01M 8/04992; B60L 50/72
See application file for complete search history.

(56) References Cited

U.S. PATENT DOCUMENTS

| | | | |
|---|---|---|---|
| 2008/0032168 A1* | 2/2008 | Fujita | H01M 8/04029 429/442 |
| 2010/0297513 A1* | 11/2010 | Yasuda | H01M 8/04164 429/423 |
| 2020/0014043 A1* | 1/2020 | Fukatsu | H01M 8/04373 |
| 2020/0099070 A1* | 3/2020 | Takagaki | H01M 8/04044 |

FOREIGN PATENT DOCUMENTS

| | | |
|---|---|---|
| JP | 2008-210763 | 9/2008 |
| JP | 2009-245861 | 10/2009 |
| JP | 2015-191765 | 11/2015 |
| WO | 2014/174982 | 10/2014 |

* cited by examiner

FUEL CELL SYSTEM

CROSS-REFERENCE TO RELATED APPLICATION

Priority is claimed on Japanese Patent Application No. 2021-060478, filed Mar. 31, 2021, the content of which is incorporated herein by reference.

BACKGROUND OF THE INVENTION

Field of the Invention

The present invention relates to a fuel cell system.

Description of Related Art

Conventionally, a metal separator has been used for a laminated battery. When metal ions are eluted from the metal separator and the metal ions are accumulated in a laminated battery, there is a problem that the laminated battery may short-circuit. A cooling device including an ion exchange resin capable of removing metal ions in cooling water of a layer-built battery, a resin water passage filled with the ion exchange resin and allowing the cooling water to pass through the ion exchange resin, a bypass passage that branches from the resin water passage and bypasses the ion exchange resin, and an opening and closing part that closes the bypass passage according to a conductive state of the cooling water is known to solve such a problem (refer to, for example, PCT International Publication No. WO 2014/174982).

SUMMARY OF THE INVENTION

In order to effectively remove metal ions, it is necessary to provide one ion exchanger for one battery. However, when a plurality of ion exchangers are used, it is difficult to accurately determine an exchange timing of each of all the ion exchangers because the exchange timing differs for each of the ion exchangers.

An aspect according to the present invention has been made in consideration of such circumstances, and one of objects is to provide a fuel cell system capable of accurately determining an exchange timing of an ion exchanger.

In order to solve the above problems and achieve the above object, the present invention has adopted the following aspects.

(1) A fuel cell system according to one aspect of the present invention includes a plurality of fuel cell stacks, a first ion exchanger configured to reduce an ion concentration in a refrigerant, a temperature acquisition part configured to acquire a temperature of the refrigerant in a plurality of refrigerant flow paths on a downstream side of the plurality of fuel cell stacks of the plurality of refrigerant flow paths for supplying the refrigerant to each of the plurality of fuel cell stacks, a power generation time acquisition part configured to acquire a power generation time of the plurality of fuel cell stacks, a supply path configured to supply the refrigerant discharged from the plurality of fuel cell stacks to the first ion exchanger, an ion concentration estimation part configured to estimate the ion concentration of the refrigerant on the basis of at least one of the temperature of the refrigerant acquired by the temperature acquisition part and the power generation time of the plurality of fuel cell stacks acquired by the power generation time acquisition part, a determination part configured to determine an exchange timing of the first ion exchanger on the basis of the ion concentration estimated by the ion concentration estimation part, and a control part configured to control the plurality of fuel cell stacks, the temperature acquisition part, the power generation time acquisition part, the ion concentration estimation part, and the determination part, wherein the plurality of refrigerant flow paths are provided in series or in parallel.

(2) In the aspect of (1), the ion concentration estimation part may estimate that, as the temperature of the refrigerant in the fuel cell stacks acquired by the temperature acquisition part becomes higher, an amount of ion elution from the refrigerant increases, and the determination part may determine the exchange timing of the first ion exchanger according to an integrated value of the ion concentration estimated from the temperature of the refrigerant acquired by the temperature acquisition part.

(3) In the aspect of (1) or (2), a pumping part configured to supply the refrigerant according to a required output of the plurality of fuel cell stacks, a stop time acquisition part configured to acquire a stop time of the plurality of fuel cell stacks, and an outside air temperature information acquisition part configured to acquire outside air temperature information while the fuel cell stacks are stopped may be further included, and the control part may determine an amount of discharge of the refrigerant that is pumped by the pumping part at startup when the plurality of fuel cell stacks start on the basis of at least one of the stop time and the outside air temperature information, and when the plurality of fuel cell stacks start, the pumping part may perform control on the basis of the amount of discharge at startup in preference to pumping control according to the required output.

(4) In the aspect of (3), the plurality of fuel cell stacks may be provided in parallel, a branch flow path configured to allow selective branching of the refrigerant in the supply path and to return the refrigerant to the refrigerant flow path on an upstream side of the plurality of fuel cell stacks, and a second ion exchanger provided in the branch flow path may be included, and the control part may control a flow time for allowing the refrigerant to flow to the branch flow path at least on the basis of the stop time when the plurality of fuel cell stacks start.

(5) In the aspect of (3), the plurality of fuel cell stacks may be provided in parallel, a branch flow path configured to selectively branch the refrigerant in the supply path and to return the refrigerant to the refrigerant flow path on an upstream side of the plurality of fuel cell stacks, and a second ion exchanger provided in the branch flow path may be included, and the control part may control a flow time for allowing the refrigerant to flow to the branch flow path at least on the basis of the power generation time when the plurality of fuel cell stacks are stopped.

(6) In the aspect of (4), the plurality of fuel cell stacks may include a first fuel cell stack and a second fuel cell stack, and the control part may circulate the refrigerant between the first fuel cell stack and the second fuel cell stack when there is a difference of a predetermined value or more between the power generation time of the first fuel cell stack at startup acquired by the power generation time acquisition part and the power generation time of the second fuel cell stack at startup acquired by the power generation time acquisition part.

(7) In the aspect of (5), the plurality of fuel cell stacks may include a first fuel cell stack and a second fuel cell stack, and the control part may circulate the refrigerant between the first fuel cell stack and the second fuel cell stack when there is a difference of a predetermined value or more between the stop time of the first fuel cell stack acquired by the stop time acquisition part and the stop time of the second fuel cell stack acquired by the stop time acquisition part.

According to (1), the ion concentration estimation part estimates the ion concentration of the refrigerant on the basis of at least one of the temperature of the refrigerant acquired by the temperature acquisition part and the power generation time of the plurality of fuel cell stacks acquired by the power generation time acquisition part, and the determination part can accurately determine the exchange timing of the ion exchanger by determining the exchange timing of the first ion exchanger on the basis of the ion concentration estimated by the ion concentration estimation part.

In the case of (2), the ion concentration estimation part estimates that, as the temperature of the refrigerant acquired by the temperature acquisition part becomes higher, the amount of ion elution increases, and the determination part determines the exchange timing of the first ion exchanger according to an integrated value of the ion concentration estimated from the temperature of the refrigerant acquired by the temperature acquisition part. Thus, the exchange timing of the ion exchanger can be accurately determined.

In the case of (3), the amount of discharge of the refrigerant at startup that is pumped by the pumping part when the plurality of fuel cell stacks start is determined on the basis of at least one of the stop time and the outside air temperature information, and when the plurality of fuel cell stacks start, the pumping part can perform control on the basis of the amount of discharge at startup in preference to the pumping control according to the required output, and can reduce a variation in a concentration of ions contained in the refrigerant in the plurality of fuel cell stacks. Thus, the exchange timing of the ion exchanger can be accurately determined.

In the case of (4), when the fuel cell stacks start, the exchange timing of the ion exchanger can be accurately determined by controlling the flow time for allowing the refrigerant to flow to the branch flow path on the basis of at least the stop time.

In the case of (5), when the fuel cell stacks are stopped, the exchange timing of the ion exchanger can be accurately determined by controlling the flow time for allowing the refrigerant to flow to the branch flow path on the basis of at least the power generation time.

In the case of (6), when there is a difference of a predetermined value or more between the power generation time of the first fuel cell stack at startup acquired by the power generation time acquisition part and the power generation time of the second fuel cell stack at startup acquired by the power generation time acquisition part, the variation in the concentration of ions contained in the refrigerant in the first fuel cell stack and the second fuel cell stack can be reduced by circulating the refrigerant between the first fuel cell stack and the second fuel cell stack. Thus, the exchange timing of the ion exchanger can be accurately determined.

In the case of (7), when there is a difference of a predetermined time or more between the stop time of the first fuel cell stack acquired by the stop time acquisition part and the stop time of the second fuel cell stack acquired by the stop time acquisition part, the variation in the concentration of ions contained in the refrigerant in the first fuel cell stack and the second fuel cell stack can be reduced by circulating the refrigerant between the first fuel cell stack and the second fuel cell stack. Thus, the exchange timing of the ion exchanger can be accurately determined.

DETAILED DESCRIPTION OF THE INVENTION

Hereinafter, embodiments of the present invention will be described with reference to the drawings.

Figure 1:
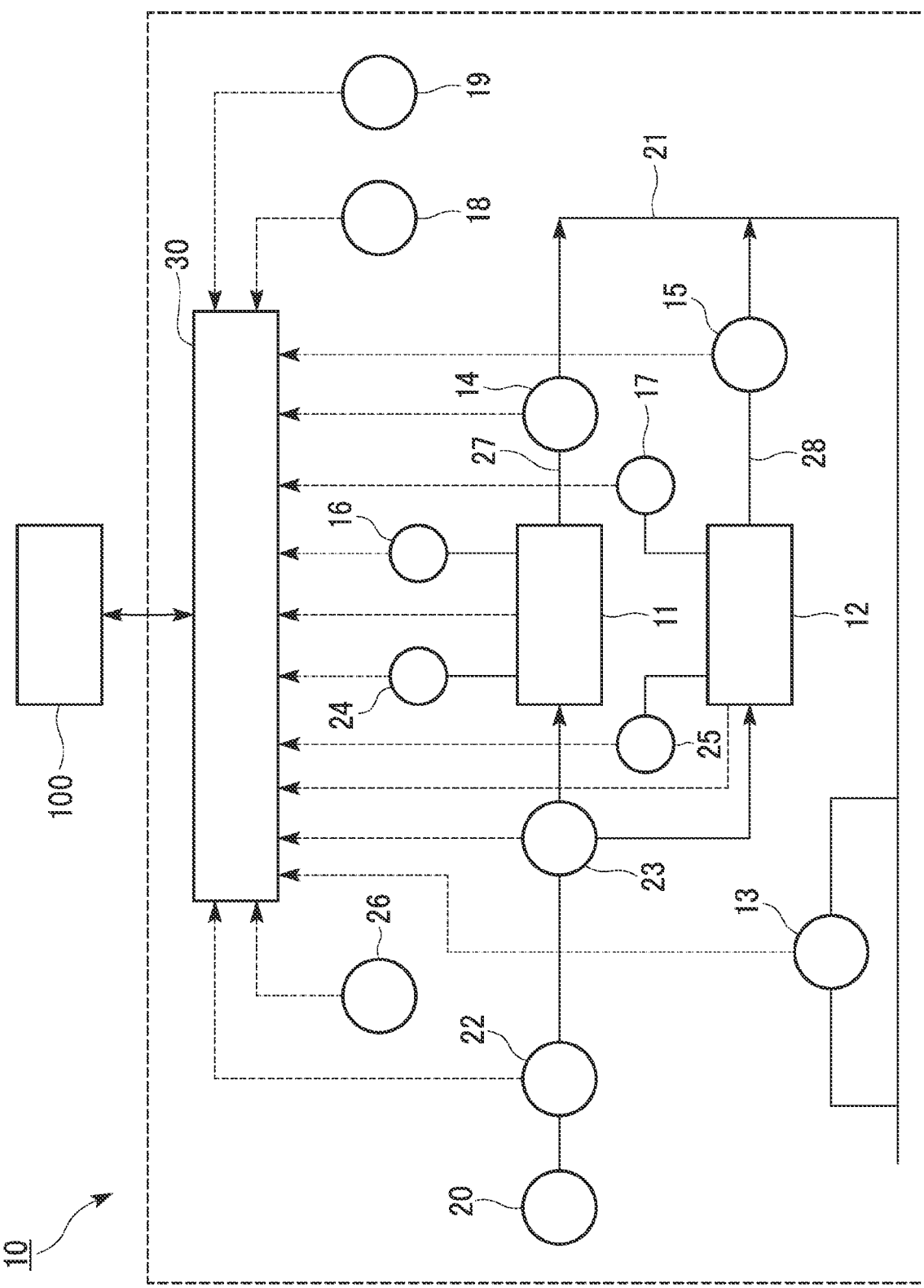
FIG. 1 is a schematic diagram showing a fuel cell system according to an embodiment of the present invention.

FIG. 1 is a schematic diagram showing a fuel cell system 10 in an embodiment.

The fuel cell system 10 can be mounted in a vehicle, for example. In addition to the fuel cell system 10, the vehicle may include devices such as a power storage device, a motor, a radiator, and a refrigerant tank. The vehicle may include the fuel cell system 10 and a control device 100 that controls other devices. The control device 100 of the vehicle may transmit and receive signals to and from a control part (a control device (an FC control device)) 30 of the fuel cell system 10.

The fuel cell system 10 includes a first fuel cell (FC) stack 11, a second fuel cell (FC) stack 12, a first ion exchanger 13, a first temperature acquisition part 14, a second temperature acquisition part 15, a first power generation time acquisition part 16, a second power generation time acquisition part 17, an ion concentration estimation part 18, a determination part 19, a refrigerant tank 20, a supply path 21, and the FC control device 30 which is an example of the control part. The FC control device 30 is connected to each of the parts of the fuel cell system 10 by a signal line. The fuel cell system 10 includes a fuel tank and an air pump which are not shown. In the fuel cell system 10, a cooling system circuit including the first FC stack 11, the second FC stack 12, the first ion exchanger 13, the first temperature acquisition part 14, the second temperature acquisition part 15, the first power generation time acquisition part 16, the second power generation time acquisition part 17, the ion concentration estimation part 18, the determination part 19, and the supply path 21 is formed. The fuel cell system 10 may include a first pumping part 22, a first valve mechanism 23, a first stop time acquisition part 24, a second stop time acquisition part 25, and an outside air temperature information acquisition part 26.

The first FC stack 11 and the second FC stack 12 are, for example, solid polymer type fuel cells. The solid polymer type fuel cell includes, for example, a plurality of stacked fuel cells and a pair of end plates that sandwich a stacked body of the plurality of fuel cells. Each of the fuel cells includes an electrolyte electrode structure and a pair of separators that sandwich the electrolyte electrode structure. The electrolyte electrode structure includes a solid polymer electrolyte membrane, and a fuel electrode and an oxygen electrode that sandwich the solid polymer electrolyte membrane. The solid polymer electrolyte membrane includes a cation exchange membrane and the like. The fuel electrode (an anode) includes an anode catalyst, a gas diffusion layer, and the like. The oxygen electrode (cathode) includes a cathode catalyst, a gas diffusion layer, and the like.

In the first FC stack 11 and the second FC stack 12, power is generated by a catalytic reaction between a fuel gas supplied from the fuel tank to the anode and an oxidant gas such as oxygen-containing air supplied from the air pump to the cathode. Excess gas components and the like supplied to the fuel cell stacks and not used are exhausted through a predetermined flow path. The first FC stack 11 and the second FC stack 12 are provided in parallel. When the fuel cell system 10 is mounted in a vehicle, for example, an output of the second FC stack 12 is adjusted by operating an accelerator.

The first ion exchanger 13 is connected to the first FC stack 11 and the second FC stack 12 via the supply path 21. The first ion exchanger 13 includes an ion exchange resin capable of removing impurity ions in the refrigerant. The first ion exchanger 13 removes impurity ions in the refrigerant flowing in the fuel cell system 10 and reduces an ion concentration of the refrigerant. Specifically, the impurity ions in the refrigerant discharged from the first FC stack 11 and the second FC stack 12 and introduced through the supply path 21 are removed.

The first temperature acquisition part 14 and the second temperature acquisition part 15 are temperature measuring devices such as a thermometer. The first temperature acquisition part 14 is provided on the downstream side of the first FC stack 11 in a first refrigerant flow path 27 that supplies the refrigerant to the first FC stack 11, and acquires a temperature of the refrigerant at that position. The second temperature acquisition part 15 is provided on the downstream side of the second FC stack 12 in a second refrigerant flow path 28 that supplies the refrigerant to the second FC stack 12, and acquires a temperature of the refrigerant at that position. The first refrigerant flow path 27 and the second refrigerant flow path 28 are provided in parallel. The first refrigerant flow path 27 and the second refrigerant flow path 28 may be provided in series.

The first power generation time acquisition part 16 is connected to the first FC stack 11 and acquires a power generation time of the first FC stack 11. The second power generation time acquisition part 17 is connected to the second FC stack 12 and acquires a power generation time of the second FC stack 12.

The ion concentration estimation part 18 is, for example, an ion concentration sensor. The ion concentration estimation part 18 estimates the ion concentration of the refrigerant discharged from the first FC stack 11 and the second FC stack 12 on the basis of at least one of the temperature of the refrigerant acquired by the first temperature acquisition part 14 and the temperature of the refrigerant acquired by the second temperature acquisition part 15, and the power generation time of the first FC stack 11 acquired by the first power generation time acquisition part 16, and the power generation time of the second FC stack 12 acquired by the second power generation time acquisition part 17. The ion concentration of the refrigerant is estimated by a conductivity of the refrigerant.

The determination part 19 determines an exchange timing of the first ion exchanger 13 on the basis of the ion concentration of the refrigerant estimated by the ion concentration estimation part 18.

The refrigerant tank 20 is filled with a refrigerant that cools the fuel cell system 10. The refrigerant tank 20 supplies the refrigerant into the cooling system circuit of the fuel cell system 10.

The supply path 21 is connected to the first FC stack 11 and the second FC stack 12 and supplies the refrigerant discharged from the first FC stack 11 and the second FC stack 12 to the first ion exchanger 13.

The first pumping part 22 is, for example, an air pump. The first pumping part 22 is connected to the refrigerant tank 20 and the first valve mechanism 23. The first pumping part 22 supplies the refrigerant in the refrigerant tank 20 into the cooling system circuit according to required outputs of the first FC stack 11 and the second FC stack 12.

The first valve mechanism 23 is connected to the refrigerant tank 20, the first FC stack 11, and the second FC stack 12. The first valve mechanism 23 includes, for example, a control valve that switches a flow rate Q, a pressure P, and the like of the refrigerant between the refrigerant tank 20 and the first FC stack 11 and the second FC stack 12 due to control of the FC control device 30, a check valve that prohibits a flow of the refrigerant from the first FC stack 11 and the second FC stack 12 side to the refrigerant tank 20, and the like.

The first stop time acquisition part 24 is connected to the first FC stack 11. The first stop time acquisition part 24 acquires a stop time of the first FC stack 11. The second stop time acquisition part 25 is connected to the second FC stack 12. The second stop time acquisition part 25 acquires a stop time of the second FC stack 12.

The outside air temperature information acquisition part 26 is a temperature measuring device such as a thermometer. The outside air temperature information acquisition part 26 acquires outside air temperature information (an outside air temperature) while the first FC stack 11 and the second FC stack 12 are stopped.

The FC control device 30 integrally controls operations of the first FC stack 11, the second FC stack 12, the first temperature acquisition part 14, the second temperature acquisition part 15, the first power generation time acquisition part 16, the second power generation time acquisition part 17, the ion concentration estimation part 18, the determination part 19, the first pumping part 22, the first valve mechanism 23, the first stop time acquisition part 24, the second stop time acquisition part 25, the outside air temperature information acquisition part 26, and the like.

An operation method of the fuel cell system 10 will be described.

In the fuel cell system 10, the ion concentration estimation part 18 estimates that as the temperature of the refrigerant in the first FC stack 11 and the second FC stack 12 acquired by the first temperature acquisition part 14 and the second temperature acquisition part 15 becomes higher, an amount of ion elution from the refrigerant increases. The determination part 19 determines the exchange timing of the first ion exchanger 13 according to an integrated value of the ion concentration estimated from the temperature of the refrigerant of the first FC stack 11 and the second FC stack 12 acquired by the first temperature acquisition part 14 and the second temperature acquisition part 15. The FC control device 30 determines an amount of discharge of the refrigerant that is pumped by the first pumping part 22 at startup when the first FC stack 11 and the second FC stack 12 start, on the basis of at least one of a stop time acquired by each of the first stop time acquisition part 24 and the second stop time acquisition part 25, and the outside air temperature information acquired by the outside air temperature information acquisition part 26, and when the first FC stack 11 and the second FC stack 12 start, the first pumping part 22 performs control based on the amount of discharge at startup in preference to the pumping control according to the required output.

A specific example of an operation method of the fuel cell system 10 will be described.

Figure 2:
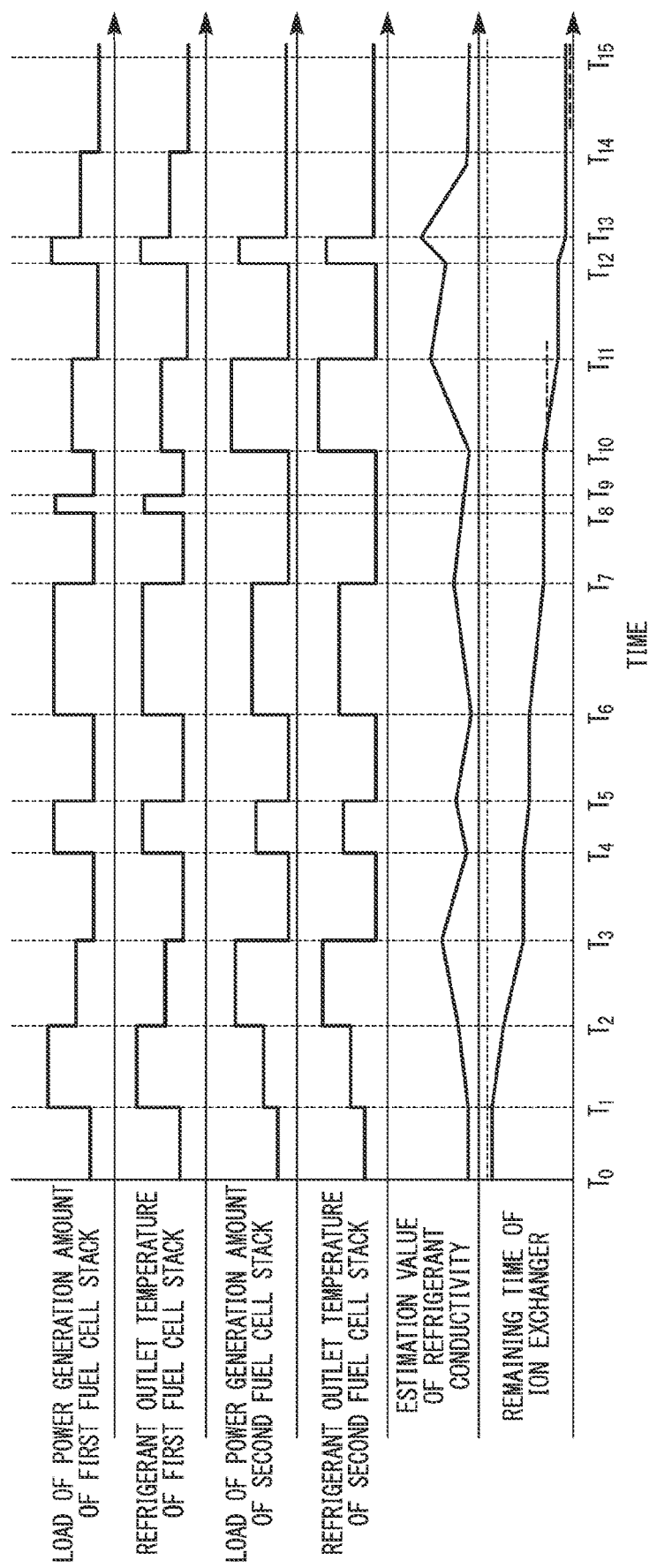
FIG. 2 is an example of a system flow showing a method of operating the fuel cell system according to the embodiment of the present invention.

FIG. 2 is a first example of a system flow showing the operation method of the fuel cell system 10.

At $T_0$ to $T_1$, the first FC stack 11 and the second FC stack 12 are stopped. Therefore, the temperature of the refrigerant discharged from the first FC stack 11 and the second FC stack 12 is low. Therefore, the ion concentration estimation part 18 estimates that an amount of ion elution from the first FC stack 11 and the second FC stack 12 is almost nonexistent. Therefore, a remaining time until the exchange of the first ion exchanger 13 hardly changes.

When the first FC stack 11 and the second FC stack 12 start at $T_1$ and the amount of power generated by the first FC stack 11 and the second FC stack 12 increases at $T_1$ to $T_2$, the temperature of the refrigerant discharged from the first FC stack 11 and the second FC stack 12 becomes high. The ion concentration estimation part 18 estimates that, as the temperature of the refrigerant discharged from the first FC stack 11 and the second FC stack 12 becomes higher, the total elution amount of the amount of ion elution discharged from the first FC stack 11 and the amount of ion elution discharged from the second FC stack 12 will increase. Accordingly, the remaining time until the exchange of the first ion exchanger 13 is shortened.

At $T_2$ to $T_3$, the amount of power generated by the first FC stack 11 is smaller than that at $T_1$ to $T_2$, and the temperature of the refrigerant discharged from the first FC stack 11 is also lower. On the other hand, the amount of power generated by the second FC stack 12 is larger than that of $T_1$ to $T_2$, and the temperature of the refrigerant discharged from the second FC stack 12 is also higher. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is further shortened.

At $T_3$ to $T_4$, when the amount of power generated by the first FC stack 11 is further reduced, the temperature of the refrigerant discharged from the first FC stack 11 is further lowered. The amount of power generated by the second FC stack 12 is reduced, and the temperature of the refrigerant discharged from the second FC stack 12 is lowered. At $T_3$ to $T_4$, the amount of power generated by the second FC stack 12 is smaller than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 hardly changes.

At $T_4$ to $T_5$, when the amount of power generated by the first FC stack 11 and the second FC stack 12 increases, the temperature of the refrigerant discharged from the first FC stack 11 and the second FC stack 12 increases. At $T_4$ to $T_5$, the amount of power generated by the second FC stack 12 is smaller than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is shortened.

At $T_5$ to $T_6$, when the amount of power generated by the first FC stack 11 and the second FC stack 12 decreases, the temperature of the refrigerant discharged from the first FC stack 11 and the second FC stack 12 is lowered. At $T_5$ to $T_6$, the amount of power generated by the second FC stack 12 is smaller than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 hardly changes.

At $T_6$ to $T_7$, when the amount of power generated by the first FC stack 11 and the second FC stack 12 increases, the temperature of the refrigerant discharged from the first FC stack 11 and the second FC stack 12 increases. At $T_6$ to $T_7$, the amount of power generated by the second FC stack 12 is smaller than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is shortened.

At $T_7$ to $T_8$, when the amount of power generated by the first FC stack 11 and the second FC stack 12 decreases, the temperature of the refrigerant discharged from the first FC stack 11 and the second FC stack 12 is lowered. At $T_7$ to $T_8$, the amount of power generated by the second FC stack 12 is smaller than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 hardly changes.

At $T_8$ to $T_9$, since the amount of power generated by the first FC stack 11 increases and the temperature of the refrigerant discharged from the first FC stack 11 increases, and the amount of power generated by the second FC stack 12 remains to be low and constant, the temperature of the refrigerant discharged from the second FC stack 12 remains to be low and constant. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 hardly changes.

At $T_9$ to $T_{10}$, when the amount of power generated by the first FC stack 11 and the second FC stack 12 decreases, the temperature of the refrigerant discharged from the first FC stack 11 and the second FC stack 12 is lowered. At $T_9$ to $T_{10}$, the amount of power generated by the second FC stack 12 is larger than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 hardly changes.

At $T_{10}$ to $T_{11}$, when the amount of power generated by the first FC stack 11 and the second FC stack 12 increases, the temperature of the refrigerant discharged from the first FC stack 11 and the second FC stack 12 increases. At $T_{10}$ to $T_{11}$, the amount of power generated by the second FC stack 12 is larger than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is shortened.

At $T_{10}$ to $T_{11}$, as shown in the following Equation (1), when the total of the power generation time of the first FC stack 11 and the power generation time of the second FC stack 12 is a predetermined value of 1 or more, the remaining time until the exchange of the first ion exchanger 13 is notified.

(Power generation time of the first fuel cell stack× temperature frequency coefficient 1)+(power generation time of the second fuel cell stack× temperature frequency coefficient 2)≥predetermined value 1 (1)

At $T_{11}$ to $T_{12}$, when the amount of power generated by the first FC stack 11 and the second FC stack 12 decreases, the temperature of the refrigerant discharged from the first FC stack 11 and the second FC stack 12 is lowered. At $T_{11}$ to $T_{12}$, the amount of power generated by the second FC stack 12 is smaller than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 hardly changes.

At $T_{12}$ to $T_{13}$, when the amount of power generated by the first FC stack 11 and the second FC stack 12 increases, the temperature of the refrigerant discharged from the first FC stack 11 and the second FC stack 12 increases. At $T_{12}$ to $T_{13}$, the amount of power generated by the first FC stack 11 and the amount of power generated by the second FC stack 12 are substantially the same. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is shortened.

At $T_{13}$ to $T_{14}$, when the amount of power generated by the first FC stack 11 and the second FC stack 12 decreases, the temperature of the refrigerant discharged from the first FC stack 11 and the second FC stack 12 is lowered. At $T_{13}$ to $T_{14}$, the amount of power generated by the second FC stack 12 is smaller than the amount of power generated by the first FC stack 11. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 is slightly shortened.

At $T_{14}$ to $T_{15}$, when the amount of power generated by the first FC stack 11 is smaller than that at $T_{13}$ to $T_{14}$, the temperature of the refrigerant discharged from the first FC stack 11 is lowered. The amount of power generated by the second FC stack 12 is the same as that at $T_{13}$ to $T_{14}$, and the temperature of the refrigerant discharged from the second FC stack 12 is the same as that at $T_{13}$ to $T_{14}$. At $T_{14}$ to $T_{15}$, the amount of power generated by the first FC stack 11 and the amount of power generated by the second FC stack 12 are substantially the same. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 is slightly shortened.

At $T_{14}$ to $T_{15}$, as shown in the following Equation (2), when the total of the power generation time of the first FC stack 11 and the power generation time of the second FC stack 12 is a predetermined value of 2 or more, the exchange of the first ion exchanger 13 is required.

(Power generation time of the first fuel cell stack× temperature frequency coefficient 1)+(power generation time of the second fuel cell stack× temperature frequency coefficient 2)≥predetermined value 2 (2)

Figure 3:
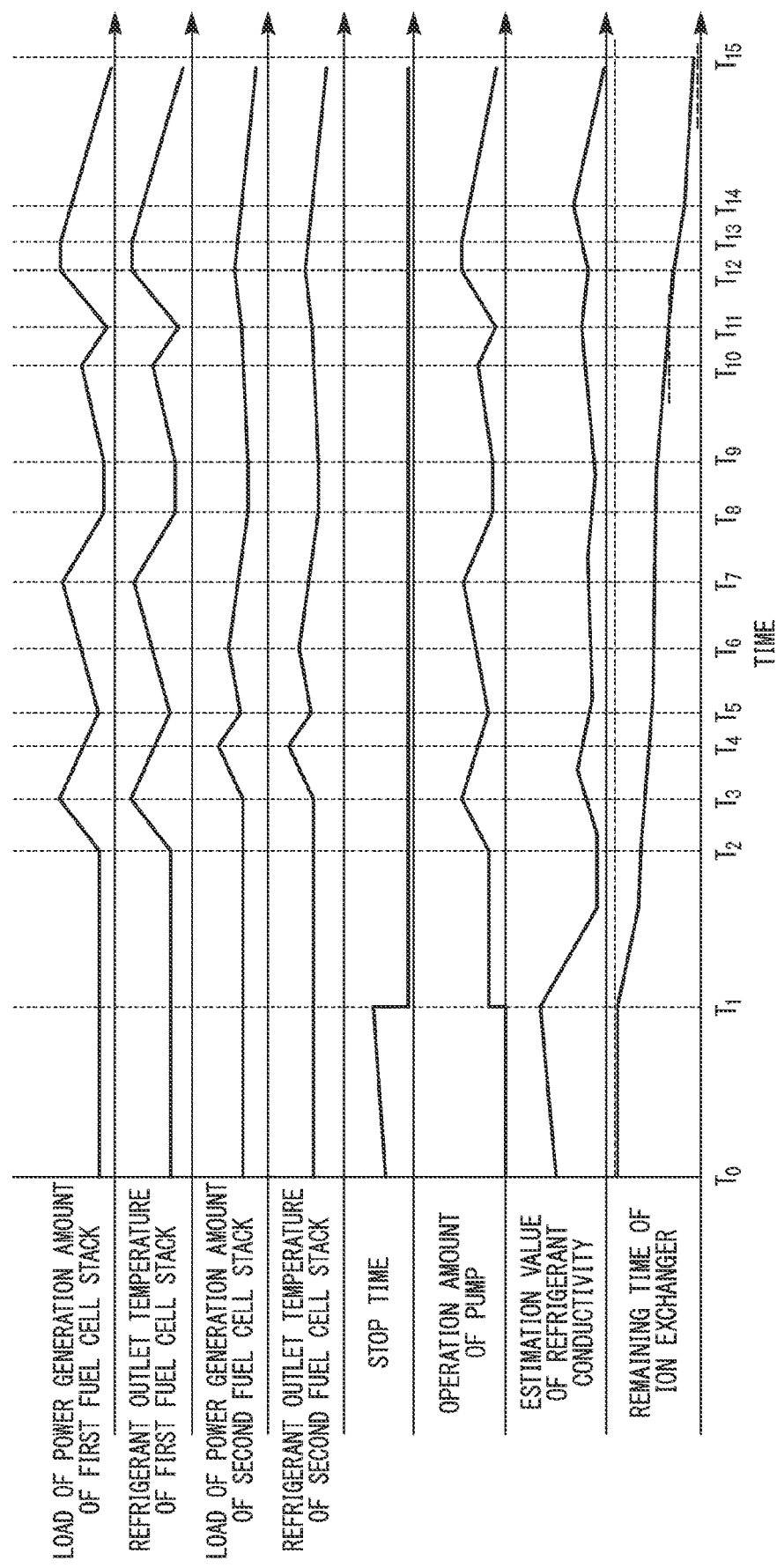
FIG. 3 is an example of the system flow showing the method of operating the fuel cell system according to the embodiment of the present invention.

FIG. 3 is a second example of the system flow showing the operation method of the fuel cell system 10.

At $T_0$ to $T_1$, the first FC stack 11 and the second FC stack 12 are stopped. Therefore, the temperature of the refrigerant discharged from the first FC stack 11 and the second FC stack 12 is lowered. A time (a stop time) during which the first FC stack 11 and the second FC stack 12 are stopped becomes longer. At $T_0$ to $T_1$, the remaining time until the exchange of the first ion exchanger 13 hardly changes.

At $T_1$ to $T_2$, before the first FC stack 11 and the second FC stack 12 start, the air pump which is the first pumping part 22 is operated, the refrigerant in the refrigerant tank 20 is supplied into the cooling system circuit, and the ion exchange resin of the first ion exchanger 13 is ion-exchanged. Therefore, the ion concentration estimation part 18 estimates that the amount of ion elution from the first FC stack 11 and the second FC stack 12 decreases. Accordingly, the remaining time until the exchange of the first ion exchanger 13 is shortened. At $T_1$ to $T_2$, since it is estimated that the total elution amount of the amount of ion elution discharged from the first FC stack 11 and the amount of ion elution discharged from the second FC stack 12 becomes constant on the way, a rate of change in an amount of decrease in the remaining time until the exchange of the first ion exchanger 13 becomes small.

At $T_2$ to $T_3$, the amount of power generated by the first FC stack 11 increases, the temperature of the refrigerant discharged from the first FC stack 11 increases, the amount of power generated by the second FC stack 12 slightly decreases, and the temperature of the refrigerant discharged from the second FC stack 12 is slightly reduced. Further, an amount of the refrigerant supplied into the cooling system circuit by the first pumping part 22 increases. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is shortened.

At $T_3$ to $T_4$, the amount of power generated by the first FC stack 11 is reduced, the temperature of the refrigerant discharged from the first FC stack 11 is lowered, the amount of power generated by the second FC stack 12 increases, and the temperature of the refrigerant discharged from the second FC stack 12 increases. Further, the amount of the refrigerant supplied into the cooling system circuit by the first pumping part 22 is reduced. At $T_3$ to $T_4$, the amount of power generated by the second FC stack 12 and the amount of increase in the temperature of the refrigerant discharged from the second FC stack 12 are smaller than the amount of power generated by the first FC stack 11 and the amount of decrease in the temperature of the refrigerant discharged from the first FC stack 11. Therefore, at $T_3$ to $T_4$, the ion concentration estimation part 18 estimates that the total elution amount of the amount of ion elution discharged from the first FC stack 11 and the amount of ion elution discharged from the second FC stack 12 increases halfway, and then the total elution amount decreases. Accordingly, the remaining time until the exchange of the first ion exchanger 13 is shortened.

At $T_4$ to $T_5$, when the amount of power generated by the first FC stack 11 and the second FC stack 12 decreases, the temperature of the refrigerant discharged from the first FC stack 11 and the second FC stack 12 is lowered. Further, the amount of the refrigerant supplied into the cooling system circuit by the first pumping part 22 is reduced. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 is shortened.

At $T_5$ to $T_6$, when the amount of power generated by the first FC stack 11 and the second FC stack 12 increases, the temperature of the refrigerant discharged from the first FC stack 11 and the second FC stack 12 increases. At $T_5$ to $T_6$, the amount of power generated by the second FC stack 12 is smaller than the amount of power generated by the first FC stack 11. Further, the amount of the refrigerant supplied into the cooling system circuit by the first pumping part 22 is increased. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 is shortened.

At $T_6$ to $T_7$, the amount of power generated by the first FC stack 11 increases, the temperature of the refrigerant discharged from the first FC stack 11 increases, the amount of power generated by the second FC stack 12 decreases, and the temperature of the refrigerant discharged from the second FC stack 12 is lowered. Further, the amount of the refrigerant supplied into the cooling system circuit by the first pumping part 22 is increased. Therefore, the ion concentration estimation part 18 estimates that the total elution amount of the amount of ion elution discharged from the first FC stack 11 and the amount of ion elution discharged from the second FC stack 12 is slightly larger. Accordingly, the remaining time until the exchange of the first ion exchanger 13 is slightly shortened.

At $T_7$ to $T_8$, when the amount of power generated by the first FC stack 11 and the second FC stack 12 decreases, the temperature of the refrigerant discharged from the first FC stack 11 and the second FC stack 12 is lowered. At $T_7$ to $T_8$, the rate of change in the amount of power generated by the second FC stack 12 is smaller than the rate of change in the amount of power generated by the first FC stack 11. Further, the amount of the refrigerant supplied into the cooling system circuit by the first pumping part 22 is reduced. Therefore, the ion concentration estimation part 18 estimates that the total elution amount of the amount of ion elution discharged from the first FC stack 11 and the amount of ion elution discharged from the second FC stack 12 slightly decreases. Accordingly, the remaining time until the exchange of the first ion exchanger 13 hardly changes.

At $T_8$ to $T_9$, when the amount of power generated by the first FC stack 11 and the second FC stack 12 hardly changes, the temperature of the refrigerant discharged from the first FC stack 11 and the second FC stack 12 hardly changes. Further, the amount of the refrigerant supplied into the cooling system circuit by the first pumping part 22 is hardly changed. Therefore, the ion concentration estimation part 18 estimates that the total elution amount of the amount of ion elution discharged from the first FC stack 11 and the amount of ion elution discharged from the second FC stack 12 hardly changes. Accordingly, the remaining time until the exchange of the first ion exchanger 13 hardly changes.

At $T_9$ to $T_{10}$, when the amount of power generated by the first FC stack 11 and the second FC stack 12 increases, the temperature of the refrigerant discharged from the first FC stack 11 and the second FC stack 12 increases. At $T_9$ to $T_{10}$, the rate of change in the amount of power generated by the second FC stack 12 is smaller than the rate of change in the amount of power generated by the first FC stack 11. Further, the amount of the refrigerant supplied into the cooling system circuit by the first pumping part 22 is slightly increased. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is shortened.

At $T_{10}$ to $T_{11}$, the amount of power generated by the first FC stack 11 decreases, the temperature of the refrigerant discharged from the first FC stack 11 is lowered, the amount of power generated by the second FC stack 12 slightly increases, and the temperature of the refrigerant discharged from the second FC stack 12 slightly increases. Further, the amount of the refrigerant supplied into the cooling system circuit by the first pumping part 22 is reduced. At $T_{10}$ to $T_{11}$, the rate of change in the amount of power generated by the second FC stack 12 is smaller than the rate of change in the amount of power generated by the first FC stack 11. Further, the amount of the refrigerant supplied into the cooling system circuit by the first pumping part 22 is reduced. Therefore, the ion concentration estimation part 18 estimates that the total elution amount of the amount of ion elution discharged from the first FC stack 11 and the amount of ion elution discharged from the second FC stack 12 increases at $T_{10}$ to $T_{11}$. Accordingly, the remaining time until the exchange of the first ion exchanger 13 is shortened.

At $T_{10}$ to $T_{11}$, as shown in the following Equation (1), when the total of the power generation time of the first FC stack 11 and the power generation time of the second FC stack 12 is a predetermined value of 1 or more, the remaining time until the exchange of the first ion exchanger 13 is notified.

(Power generation time of the first fuel cell stack× temperature frequency coefficient 1)+(power generation time of the second fuel cell stack× temperature frequency coefficient 2)≥predetermined value 1    (1)

At $T_{11}$ to $T_{12}$, when the amount of power generated by the first FC stack 11 and the second FC stack 12 increases, the temperature of the refrigerant discharged from the first FC stack 11 and the second FC stack 12 increases. At $T_{11}$ to $T_{12}$, the amount of power generated by the second FC stack 12 is smaller than the amount of power generated by the first FC stack 11. Further, the amount of the refrigerant supplied into the cooling system circuit by the first pumping part 22 is increased. Therefore, the ion concentration estimation part 18 estimates that the amount of ion elution from the first FC stack 11 and the second FC stack 12 decreases. Accordingly, the remaining time until the exchange of the first ion exchanger 13 is shortened.

At $T_{12}$ to $T_{13}$, the amount of power generated by the first FC stack 11 and the temperature of the refrigerant discharged from the first FC stack 11 hardly change, the amount of power generated by the second FC stack 12 is slightly lower, and the temperature of the refrigerant discharged from the second FC stack 12 is slightly lowered. Further, the amount of the refrigerant supplied into the cooling system circuit by the first pumping part 22 is increased and then kept to be constant. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is shortened.

At $T_{13}$ to $T_{14}$, when the amount of power generated by the first FC stack 11 and the second FC stack 12 decreases, the temperature of the refrigerant discharged from the first FC stack 11 and the second FC stack 12 is lowered. At $T_{13}$ to $T_{14}$, the rate of change in the amount of power generated by the second FC stack 12 is smaller than the rate of change in the amount of power generated by the first FC stack 11. Further, the amount of the refrigerant supplied into the cooling system circuit by the first pumping part 22 is slightly reduced. Therefore, the ion concentration estimation part 18 estimates that the total elution amount of the amount of ion elution discharged from the first FC stack 11 and the amount of ion elution discharged from the second FC stack 12 increases. Accordingly, the remaining time until the exchange of the first ion exchanger 13 is slightly shortened.

At $T_{14}$ to Tis, when the amount of power generated by the first FC stack 11 is smaller than that at $T_{13}$ to $T_{14}$, the temperature of the refrigerant discharged from the first FC stack 11 is lowered, and when the amount of power generated by the second FC stack 12 is smaller than that at $T_{13}$ to $T_{14}$, the temperature of the refrigerant discharged from the second FC stack 12 is lowered. At $T_{14}$ to $T_{15}$, the rate of change in the amount of power generated by the second FC stack 12 is smaller than the rate of change in the amount of power generated by the first FC stack 11. Further, the amount of the refrigerant supplied into the cooling system circuit by the first pumping part 22 is reduced. Therefore, the ion concentration estimation part 18 estimates that the total elution amount of the amount of ion elution discharged from the first FC stack 11 and the amount of ion elution discharged from the second FC stack 12 decreases. Accordingly, the remaining time until the exchange of the first ion exchanger 13 is shortened.

At $T_{14}$ to $T_{15}$, as shown in the following Equation (2), when the total of the power generation time of the first FC stack 11 and the power generation time of the second FC stack 12 is a predetermined value of 2 or more, the exchange of the first ion exchanger 13 is required.

(Power generation time of the first fuel cell stack×
temperature frequency coefficient 1)+(power
generation time of the second fuel cell stack×
temperature frequency coefficient 2)≥predetermined value 2       (2)

As described above, in the fuel cell system 10 of the embodiment, the ion concentration estimation part 18 estimates the ion concentration on the basis of at least one of the temperature of the refrigerant acquired by the first temperature acquisition part 14 and the second temperature acquisition part 15 and the power generation time acquired by the first power generation time acquisition part 16 and the second power generation time acquisition part 17, and the determination part 19 can accurately determine an exchange timing of the first ion exchanger 13 by determining the exchange timing of the first ion exchanger 13 on the basis of the ion concentration estimated by the ion concentration estimation part 18. Thus, the first ion exchanger 13 can be used up to the end, and convenience can be improved.

The ion concentration estimation part 18 estimates that, as the temperature of the refrigerant acquired by the first temperature acquisition part 14 and the second temperature acquisition part 15 becomes higher, the amount of ion elution increases, and the determination part 19 determines the exchange timing of the first ion exchanger 13 according to an integrated value of the ion concentration estimated from the temperature of the refrigerant acquired by the first temperature acquisition part 14 and the second temperature acquisition part 15. Thus, the exchange timing of the first ion exchanger 13 can be accurately determined.

The amount of discharge of the refrigerant that is pumped by the first pumping part 22 at startup when the first FC stack 11 and the second FC stack 12 start is determined on the basis of at least one of the stop time and the outside air temperature information, and when the first FC stack 11 and the second FC stack 12 start, the first pumping part 22 can perform control based on the amount of discharge at startup in preference to the pumping control according to the required output, and can reduce a variation in a concentration of ions contained in the refrigerant in the first FC stack 11 and the second FC stack 12. Thus, the exchange timing of the first ion exchanger 13 can be accurately determined.

OTHER EXAMPLES

Figure 4:
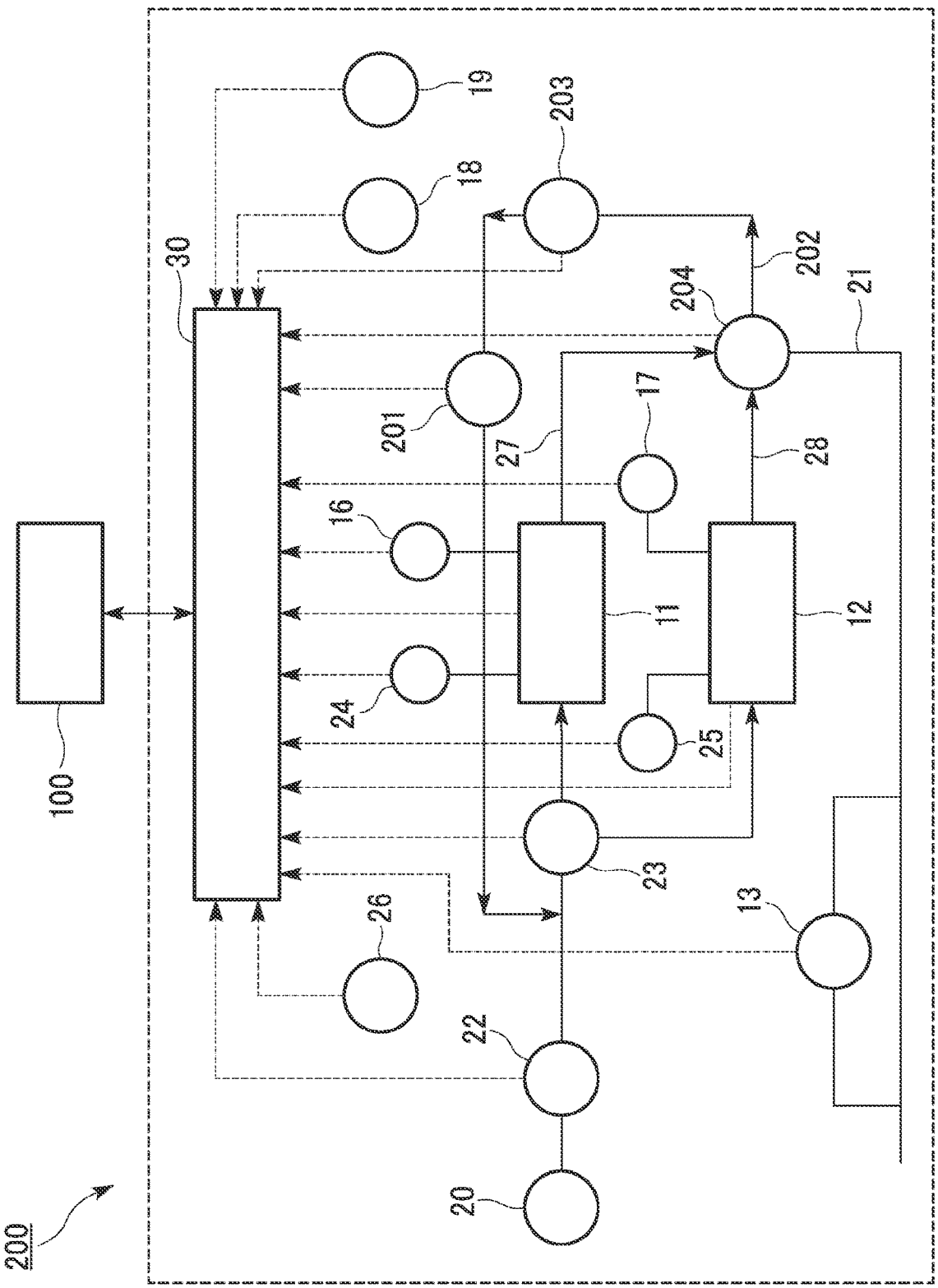
FIG. 4 is a schematic diagram showing the fuel cell system according to the embodiment of the present invention.

FIG. 4 is a schematic diagram showing a fuel cell system 200 in an embodiment.

In the fuel cell system 200, the same parts as the constituents in the fuel cell system 10 are designated by the same reference numerals, the description thereof will be omitted, and only the differences will be described.

The fuel cell system 200 includes a second ion exchanger 201 and a branch flow path 202 in addition to the configuration of the fuel cell system 10. The fuel cell system 200 may include a second pumping part 203 and a second valve mechanism 204.

The second ion exchanger 201 is provided in the branch flow path 202 and is connected to the first FC stack 11 and the second FC stack 12 via the branch flow path 202, the second valve mechanism 204, the first refrigerant flow path 27, and the second refrigerant flow path 28.

The branch flow path 202 selectively branches the refrigerant into the supply path 21 by the second valve mechanism 204 and returns the refrigerant to the first refrigerant flow path 27 on the upstream side of the first FC stack 11 and the second refrigerant flow path 28 on the upstream side of the second FC stack 12.

The second pumping part 203 is provided in the branch flow path 202 and pumps the refrigerant branched from the supply path 21 to the first refrigerant flow path 27 on the upstream side of the first FC stack 11 and the second refrigerant flow path 28 on the upstream side of the second FC stack 12.

The operation method of the fuel cell system 200 will be described.

In the fuel cell system 200, the FC control device 30 controls a flow time for allowing the refrigerant to flow to the branch flow path 202 at least on the basis of the power generation time when the first FC stack 11 and the second FC stack 12 are stopped. When there is a difference of a predetermined value or more between the power generation time of the first FC stack 11 at startup acquired by the first power generation time acquisition part 16 and the power generation time of the second FC stack 12 at startup acquired by the second power generation time acquisition part 17, the FC control device 30 circulates the refrigerant between the first FC stack 11 and the second FC stack 12. When there is a difference of a predetermined time or more between the stop time of the first FC stack 11 acquired by the first stop time acquisition part 24 and the stop time of the second FC stack 12 acquired by the second stop time acquisition part 25, the FC control device 30 circulates the refrigerant between the first FC stack 11 and the second FC stack 12.

A specific example of an operation method of the fuel cell system 200 will be described.

Figure 5:
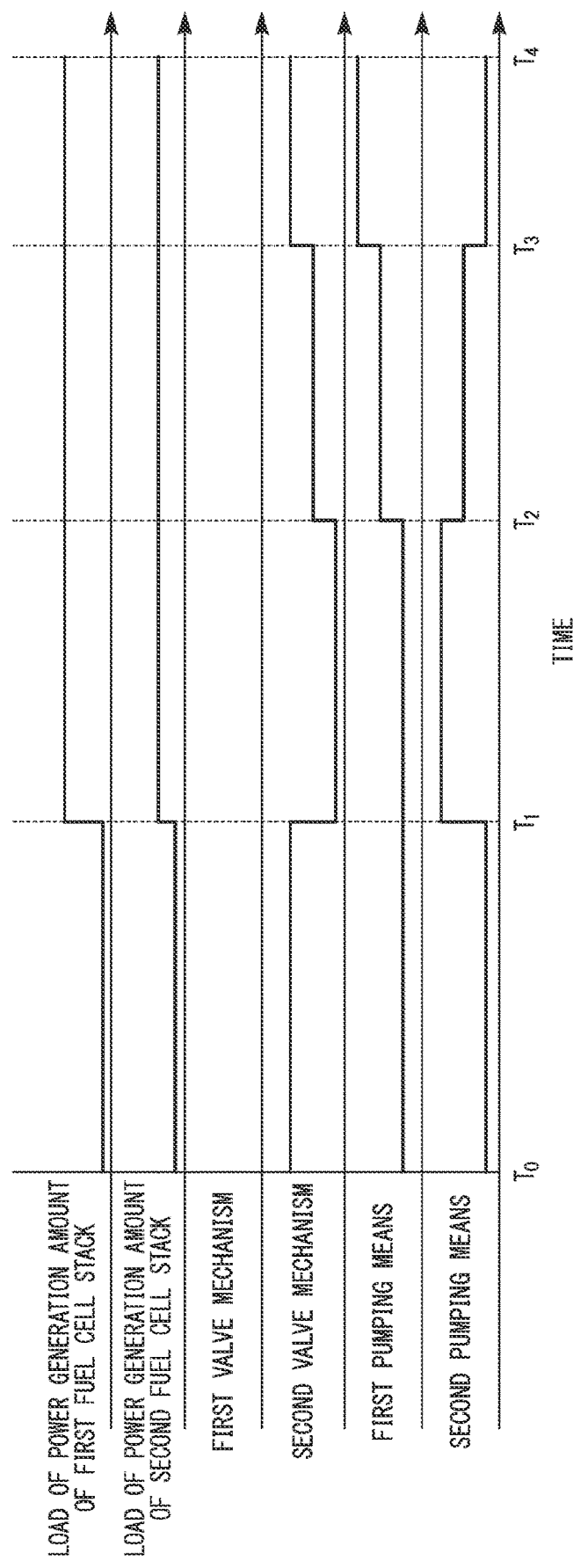
FIG. 5 is an example of the system flow showing the method of operating the fuel cell system according to the embodiment of the present invention.

FIG. 5 is an example of a system flow showing the operation method of the fuel cell system 200.

At $T_0$ to $T_1$, the first FC stack 11 and the second FC stack 12 are stopped. The first valve mechanism 23 and the second valve mechanism 204 are open. The first pumping part 22 and the second pumping part 203 do not start. When the first FC stack 11 and the second FC stack 12 are stopped, the FC control device 30 controls the flow time for allowing the refrigerant to flow to the branch flow path 202 at least on the basis of the power generation time of the first FC stack 11 acquired by the first power generation time acquisition part 16 and the power generation time of the second FC stack 12 acquired by the second power generation time acquisition part 17. That is, the second valve mechanism 204 is adjusted to control the flow time for allowing the refrigerant to flow to the branch flow path 202.

At $T_1$, when the first FC stack 11 and the second FC stack 12 start, the FC control device 30 controls the flow time for allowing the refrigerant to flow to the branch flow path 202 at least on the basis of the stop time of the first FC stack 11 acquired by the first stop time acquisition part 24 and the stop time of the second FC stack 12 acquired by the second stop time acquisition part 25. That is, the second valve mechanism 204 is adjusted to control the flow time for allowing the refrigerant to flow to the branch flow path 202.

At $T_1$ to $T_2$, the second valve mechanism 204 is closed, and the second pumping part 203 start to pump the refrigerant branched from the supply path 21 to the first refrigerant flow path 27 on the upstream side of the first FC stack 11 and the second refrigerant flow path 28 on the upstream side of the second FC stack 12.

At $T_2$ to $T_3$, the second valve mechanism 204 slightly opens to start the first pumping part 22 and keep the second pumping part 203 in a started state. An output of the first pumping part 22 (an output that pumps the refrigerant) and an output of the second pumping part 203 (an output that pumps the refrigerant) are made substantially the same. Thus, the refrigerant branched from the supply path 21 is pumped to the first refrigerant flow path 27 on the upstream side of the first FC stack 11 and the second refrigerant flow path 28 on the upstream side of the second FC stack 12, and the refrigerant discharged from the first FC stack 11 and the second FC stack 12 is supplied to the first ion exchanger 13 via the supply path 21.

At $T_3$ to $T_4$, the second valve mechanism 204 further opens to keep the first pumping part 22 and the second pumping part 203 in a started. The output of the first pumping part 22 is made larger than the output of the second pumping part 203. Thus, the refrigerant discharged from the first FC stack 11 and the second FC stack 12 is supplied only to the first ion exchanger 13 via the supply path 21.

As described above, in the fuel cell system 200 of the embodiment, when the first FC stack 11 and the second FC stack 12 start, the exchange timing of the first ion exchanger 13 and the second ion exchanger 201 can be accurately determined by controlling the flow time for allowing the refrigerant to flow to the branch flow path 202 on the basis of at least the stop time.

When the first FC stack 11 and the second FC stack 12 start, the exchange timing of the first ion exchanger 13 and the second ion exchanger 201 can be accurately determined by controlling the flow time for allowing the refrigerant to flow to the branch flow path 202 on the basis of at least the stop time.

When the first FC stack 11 and the second FC stack 12 are stopped, the exchange timing of the first ion exchanger 13 and the second ion exchanger 201 can be it accurately determined by controlling the flow time for allowing the refrigerant to flow to the branch flow path 202 on the basis of at least the power generation time.

When there is a difference of a predetermined value or more between the power generation time of the first FC stack 11 at startup acquired by the first power generation time acquisition part 16 and the power generation time of the second FC stack 12 at startup acquired by the second power generation time acquisition part 17, the variation in the concentration of ions contained in the refrigerant in the first FC stack 11 and the second FC stack 12 can be reduced by circulating the refrigerant between the first FC stack 11 and the second FC stack 12. Thus, the exchange timing of the first ion exchanger 13 and the second ion exchanger 201 can be accurately determined.

When there is a difference of a predetermined time or more between the stop time of the first FC stack 11 acquired by the first stop time acquisition part 24 and the stop time of the second FC stack 12 acquired by the second stop time acquisition part 25, the variation in the concentration of ions contained in the refrigerant in the first FC stack 11 and the second FC stack 12 can be reduced by circulating the refrigerant between the first FC stack 11 and the second FC stack 12. Thus, the exchange timing of the first ion exchanger 13 and the second ion exchanger 201 can be accurately determined.

In the above-described embodiment, although the example in which the fuel cell system is mounted in a fuel cell vehicle in which the power generated by the fuel cell is used as power for traveling or power for operating in-vehicle devices has been described, the system may be mounted in an automobile such as a two-wheeled vehicle, a three-wheeled vehicle, a four-wheeled vehicle, or another moving body (for example, a ship, a flying object, a robot), or may be mounted in a stationary fuel cell system.

While preferred embodiments of the invention have been described and illustrated above, it should be understood that the embodiments are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell system comprising:
   a plurality of fuel cell stacks;
   a first ion exchanger configured to reduce an ion concentration in a refrigerant;
   a temperature acquisition part configured to acquire a temperature of the refrigerant in a plurality of refrigerant flow paths on a downstream side of the plurality of fuel cell stacks of the plurality of refrigerant flow paths for supplying the refrigerant to each of the plurality of fuel cell stacks;

a power generation time acquisition part configured to acquire a power generation time of the plurality of fuel cell stacks;

a supply path configured to supply the refrigerant discharged from the plurality of fuel cell stacks to the first ion exchanger;

an ion concentration estimation part configured to estimate the ion concentration of the refrigerant based on at least one of the temperature of the refrigerant acquired by the temperature acquisition part and the power generation time of the plurality of fuel cell stacks acquired by the power generation time acquisition part;

a determination part configured to determine an exchange timing of the first ion exchanger based on the ion concentration estimated by the ion concentration estimation part; and a control part configured to control the plurality of fuel cell stacks, the temperature acquisition part, the power generation time acquisition part, the ion concentration estimation part, and the determination part, wherein the plurality of refrigerant flow paths are provided in series or in parallel.

2. The fuel cell system according to claim 1, wherein the ion concentration estimation part estimates that, as the temperature of the refrigerant in the fuel cell stacks acquired by the temperature acquisition part becomes higher, an amount of ion elution from the refrigerant increases, and the determination part determines the exchange timing of the first ion exchanger according to an integrated value of the ion concentration estimated from the temperature of the refrigerant acquired by the temperature acquisition part.

3. The fuel cell system according to claim 1, further comprising:

a pumping part configured to supply the refrigerant according to a required output of the plurality of fuel cell stacks;

a stop time acquisition part configured to acquire a stop time of the plurality of fuel cell stacks; and an outside air temperature information acquisition part configured to acquire outside air temperature information while the fuel cell stacks are stopped, wherein the control part determines an amount of discharge of the refrigerant that is pumped by the pumping part at startup when the plurality of fuel cell stacks start based on at least one of the stop time and the outside air temperature information, and when the plurality of fuel cell stacks start, the pumping part performs control based on the amount of discharge at startup in preference to pumping control according to the required output.

4. The fuel cell system according to claim 3, wherein the plurality of fuel cell stacks are provided in parallel, a branch flow path configured to allow selective branching of the refrigerant in the supply path and to return the refrigerant to the refrigerant flow path on an upstream side of the plurality of fuel cell stacks, and a second ion exchanger provided in the branch flow path are included, and the control part controls a flow time for allowing the refrigerant to flow to the branch flow path at least based on the stop time when the plurality of fuel cell stacks start.

5. The fuel cell system according to claim 4, wherein the plurality of fuel cell stacks include a first fuel cell stack and a second fuel cell stack, and the control part circulates the refrigerant between the first fuel cell stack and the second fuel cell stack when there is a difference of a predetermined value or more between the power generation time of the first fuel cell stack at startup acquired by the power generation time acquisition part and the power generation time of the second fuel cell stack at startup acquired by the power generation time acquisition part.

6. The fuel cell system according to claim 3, wherein the plurality of fuel cell stacks are provided in parallel, a branch flow path configured to selectively branch the refrigerant in the supply path and to return the refrigerant to the refrigerant flow path on an upstream side of the plurality of fuel cell stacks, and a second ion exchanger provided in the branch flow path are included, and the control part controls a flow time for allowing the refrigerant to flow to the branch flow path at least based on the power generation time when the plurality of fuel cell stacks are stopped.

7. The fuel cell system according to claim 5, wherein the plurality of fuel cell stacks include a first fuel cell stack and a second fuel cell stack, and the control part circulates the refrigerant between the first fuel cell stack and the second fuel cell stack when there is a difference of a predetermined value or more between the stop time of the first fuel cell stack acquired by the stop time acquisition part and the stop time of the second fuel cell stack acquired by the stop time acquisition part.

* * * * *